United States Patent
Gunn, III et al.

(10) Patent No.: US 6,990,257 B2
(45) Date of Patent: Jan. 24, 2006

(54) ELECTRONICALLY BIASED STRIP LOADED WAVEGUIDE

(75) Inventors: Lawrence Cary Gunn, III, Altadena, CA (US); Axel Scherer, Laguna Beach, CA (US)

(73) Assignee: California Institute of Technology, Pasadena, CA (US)

( * ) Notice: Subject to any disclaimer, the term of this patent is extended or adjusted under 35 U.S.C. 154(b) by 47 days.

(21) Appl. No.: 10/241,285

(22) Filed: Sep. 9, 2002

(65) Prior Publication Data

US 2003/0063885 A1 Apr. 3, 2003

Related U.S. Application Data

(60) Provisional application No. 60/318,456, filed on Sep. 10, 2001, and provisional application No. 60/318,445, filed on Sep. 10, 2001.

(51) Int. Cl.
*G02F 1/035* (2006.01)
*G02B 6/10* (2006.01)

(52) U.S. Cl. .................. 385/2; 385/8; 385/14; 385/129; 385/130; 385/131

(58) Field of Classification Search .............. 385/2, 385/8, 14, 129–132, 141
See application file for complete search history.

(56) References Cited

U.S. PATENT DOCUMENTS

| | | | |
|---|---|---|---|
| 3,462,211 A | 8/1969 | Nelson et al. | |
| 3,634,788 A | 1/1972 | Craven | 333/210 |
| 3,970,364 A | 7/1976 | Gerson et al. | |
| 3,976,358 A | 8/1976 | Thompson | |
| 4,420,873 A | 12/1983 | Leonberger et al. | |
| 4,669,086 A | 5/1987 | Kaede et al. | 372/32 |
| 4,728,167 A | 3/1988 | Soref et al. | 385/16 |
| 4,776,655 A | 10/1988 | Robertson et al. | 385/130 |
| 4,787,691 A | 11/1988 | Lorenzo et al. | |
| 4,857,973 A | 8/1989 | Yang et al. | |
| 4,874,216 A | 10/1989 | Utaka et al. | 385/37 |

(Continued)

FOREIGN PATENT DOCUMENTS

| | | |
|---|---|---|
| EP | 0 726 477 A2 | 8/1996 |
| EP | 0 751 409 A2 | 1/1997 |
| GB | 2 243 241 A | 10/1991 |
| JP | 63-106605 | 5/1988 |
| JP | 2001-4877 | 1/2001 |
| WO | WO 02/082134 A1 | 10/2002 |
| WO | WO 02/082146 A1 | 10/2002 |
| WO | WO 03/107051 | 12/2003 |

OTHER PUBLICATIONS

Ph. Lalanne et al., *Model conversion with artificial materials for photonic–crystal waveguides*, Optics Express, vol. 10, No. 8, Apr. 22, 2002, pp. 354–359.

(Continued)

*Primary Examiner*—John D. Lee
*Assistant Examiner*—Daniel Petkovsek
(74) *Attorney, Agent, or Firm*—Knobbe, Martens, Olson & Bear, LLP

(57) ABSTRACT

A strip loaded waveguide comprises a slab and a strip, wherein the strip is separated from the slab. Nevertheless, a guiding region is provided for propagating an optical mode and this guiding region extends both within the strip and the slab. A layer of material having an index of refraction lower than that of the strip and the slab may be disposed between and separate the strip and the slab. In one embodiment, the slab comprises a crystalline silicon, the strip comprises polysilicon or crystalline silicon, and the layer of material therebetween comprises silicon dioxide. Such waveguides may be formed on the same substrate with transistors. These waveguides may also be electrically biased to alter the index of refraction and/or absorption of the waveguide.

20 Claims, 9 Drawing Sheets

U.S. PATENT DOCUMENTS

| | | | |
|---|---|---|---|
| 4,877,299 A | 10/1989 | Lorenzo et al. | |
| 4,956,682 A | 9/1990 | Ohmaka et al. | |
| 4,958,898 A | 9/1990 | Friedman et al. | |
| 4,999,686 A | 3/1991 | Autier et al. | |
| 5,001,523 A | 3/1991 | Lomashevich et al. | 359/332 |
| 5,003,359 A | 3/1991 | Abeles | 257/20 |
| 5,033,812 A | 7/1991 | Yoshida et al. | |
| 5,048,907 A * | 9/1991 | Wickman et al. | 385/2 |
| 5,061,030 A * | 10/1991 | Miyamoto et al. | 385/3 |
| 5,078,516 A | 1/1992 | Kapon et al. | |
| 5,101,459 A | 3/1992 | Sunagawa | |
| 5,109,464 A | 4/1992 | Munowitz et al. | 385/130 |
| 5,125,065 A * | 6/1992 | Stoll et al. | 385/130 |
| 5,132,843 A | 7/1992 | Aoyama et al. | |
| 5,146,513 A | 9/1992 | Inoue et al. | 385/13 |
| 5,148,507 A * | 9/1992 | Tanisawa | 385/41 |
| 5,199,092 A | 3/1993 | Stegmueller | 385/50 |
| 5,200,939 A | 4/1993 | Nishiwaki et al. | |
| 5,222,162 A | 6/1993 | Yap et al. | |
| 5,225,740 A | 7/1993 | Ohkawa | 315/111.41 |
| 5,227,701 A | 7/1993 | McIntyre | 315/5.41 |
| 5,303,319 A | 4/1994 | Ford et al. | 385/131 |
| 5,314,107 A | 5/1994 | d'Aragona et al. | |
| 5,329,601 A | 7/1994 | Nakamura | |
| 5,347,601 A * | 9/1994 | Ade et al. | 385/3 |
| 5,436,991 A | 7/1995 | Sunagawa et al. | |
| 5,459,807 A | 10/1995 | Doumuki et al. | |
| 5,491,768 A | 2/1996 | Chan | 385/132 |
| 5,534,824 A | 7/1996 | Nalos et al. | 331/81 |
| 5,546,494 A | 8/1996 | Eda | 385/129 |
| 5,613,020 A | 3/1997 | Uchida et al. | 385/9 |
| 5,625,725 A * | 4/1997 | Nakano et al. | 385/14 |
| 5,625,729 A | 4/1997 | Brown | 385/31 |
| 5,654,818 A | 8/1997 | Yao | |
| 5,682,455 A | 10/1997 | Kovacic et al. | |
| 5,684,817 A | 11/1997 | Houdre et al. | |
| 5,703,989 A | 12/1997 | Khan et al. | 385/130 |
| 5,737,474 A | 4/1998 | Aoki et al. | |
| 5,742,433 A | 4/1998 | Shiono et al. | |
| 5,745,630 A | 4/1998 | Vawter et al. | |
| 5,759,453 A | 6/1998 | Kato | |
| 5,784,400 A | 7/1998 | Joannopoulos et al. | 372/96 |
| 5,841,931 A | 11/1998 | Foresi et al. | 385/132 |
| 5,889,898 A | 3/1999 | Koren et al. | |
| 5,908,305 A * | 6/1999 | Crampton et al. | 438/141 |
| 5,917,195 A | 6/1999 | Brown | 257/22 |
| 5,917,981 A | 6/1999 | Kovacic et al. | |
| 5,955,749 A | 9/1999 | Joannopoulos et al. | |
| 6,052,495 A | 4/2000 | Little et al. | |
| 6,055,342 A * | 4/2000 | Yi et al. | 385/2 |
| 6,101,300 A | 8/2000 | Fan et al. | |
| 6,108,464 A | 8/2000 | Foresi et al. | 385/14 |
| 6,134,369 A | 10/2000 | Kurosawa | 385/132 |
| 6,151,430 A | 11/2000 | Traver, Jr. et al. | |
| 6,175,671 B1 | 1/2001 | Roberts | |
| 6,195,187 B1 | 2/2001 | Soref et al. | |
| 6,229,947 B1 | 5/2001 | Vawter et al. | 385/132 |
| 6,243,517 B1 | 6/2001 | Deacon | |
| 6,261,525 B1 | 7/2001 | Minaee | 422/186 |
| 6,278,822 B1 * | 8/2001 | Dawnay | 385/50 |
| 6,285,813 B1 | 9/2001 | Schultz et al. | |
| 6,374,001 B1 | 4/2002 | Bozeat et al. | 385/8 |
| 6,396,984 B1 | 5/2002 | Cho et al. | 385/43 |
| 6,400,490 B1 * | 6/2002 | Hosoi | 359/254 |
| 6,411,752 B1 | 6/2002 | Little et al. | 385/17 |
| 6,466,342 B1 | 10/2002 | Frigo et al. | 398/82 |
| 6,507,681 B1 * | 1/2003 | Kowalczyk et al. | 385/16 |
| 6,614,977 B2 | 9/2003 | Johnson et al. | 385/129 |
| 6,631,225 B2 | 10/2003 | Lee et al. | 385/28 |
| 6,633,696 B1 | 10/2003 | Vahala et al. | 385/27 |
| 6,636,668 B1 | 10/2003 | Al-hemyari et al. | 385/40 |
| 6,731,846 B2 | 5/2004 | Hosomi et al. | 385/123 |
| 6,734,453 B2 | 5/2004 | Atanackovic et al. | 257/19 |
| 6,751,368 B2 | 6/2004 | Lim et al. | 385/14 |
| 6,759,675 B2 | 7/2004 | Csutak et al. | 257/21 |
| 6,768,855 B1 * | 7/2004 | Bakke et al. | 385/129 |
| 6,801,702 B2 * | 10/2004 | Day | 385/130 |
| 6,834,152 B2 | 12/2004 | Gunn et al. | 385/130 |
| 6,839,488 B2 | 1/2005 | Gunn | 385/40 |
| 6,895,148 B2 | 5/2005 | Gunn | 385/50 |
| 6,917,727 B2 | 7/2005 | Gunn et al. | 385/14 |
| 2002/0031321 A1 | 3/2002 | Lee et al. | 385/129 |
| 2002/0057720 A1 | 5/2002 | Nomura et al. | 372/18 |
| 2002/0081055 A1 | 6/2002 | Painter et al. | 385/2 |
| 2002/0094150 A1 | 7/2002 | Lim et al. | 385/15 |
| 2002/0094183 A1 | 7/2002 | Wu et al. | |
| 2002/0164118 A1 | 11/2002 | Paddon et al. | |
| 2002/0164129 A1 | 11/2002 | Jackson | |
| 2002/0164143 A1 | 11/2002 | Csutak et al. | 385/131 |
| 2003/0002766 A1 * | 1/2003 | Pruneri et al. | 385/2 |
| 2003/0031446 A1 | 2/2003 | Gao et al. | 385/130 |
| 2003/0068151 A1 | 4/2003 | Gunn | 385/129 |
| 2003/0190107 A1 * | 10/2003 | Walker | 385/2 |
| 2004/0022474 A1 | 2/2004 | Lim et al. | 385/4 |
| 2004/0076362 A1 | 4/2004 | Wong et al. | 385/14 |

OTHER PUBLICATIONS

U.S. Appl. No. 10/242,682, filed Sep. 10, 2002, entitled Structure and Method for Coupling Light Between Dissimilar Waveguides (LUXCAL.002A).

U.S. Appl. No. 10/241,284, filed Sep. 9, 2002, entitled Strip Loaded Waveguide with Low–Index Transition Layer (LUXCAL.003A).

U.S. Appl. No. 10/242,136, filed Sep. 9, 2002, entitled Strip Loaded Waveguide Integrated with Electronics Components (LUXCAL.004A).

U.S. Appl. No. 10/242,314, filed Sep. 10, 2002, entitled Tunable Resonant Cavity Based on the Field Effect in Semiconductors (LUXCAL.005A).

U.S. Appl. No. 10/242,313, filed Sep. 10, 2002, entitled Modulator Based on Tunable Resonant Cavity (LUXCAL.006A).

U.S. Appl. No. 10/242,318, filed Sep. 10, 2002, entitled Tuning the Index of a Waveguide Structure (LUXCAL.007A).

Azzam, R. M. A. and N. M. Bashara, "Generalized Ellipsometry for Surfaces with Directional Preference: Application to Diffraction Gratings," *J. Opt. Soc. Am.* vol. 62, No. 12, Dec. 1972, pp 1521–1523.

Ogawa, K., W. S. C. Chang, B. L. Sopori, and F. J. Rosenbaum, "A Theoretical Analysis of Etched Grating Couplers for Integrated Optics," *IEEE J. Quantum Electron.*, vol. QE–9, No. 1, Jan. 1973, pp. 29–42.

Neviere, M., R. Petit, and M. Cadilhac, "About the Theory of Optical Grating Coupler–Waveguide Systems," *Optics Comm.* vol. 8, No. 2, Jun. 1973, pp. 113–117.

Neviere, M., P. Vincent, R. Petit and M. Cadilhac, "Systematic Study of Resonances of Holographic Thin Film Couplers," *Optics Comm.*, vol. 9, No. 1, Sep. 1973, pp. 48–53.

Neviere, M., P. Vincent, R. Petit and M. Cadilhac, "Determination of the Coupling Coefficient of a Holographic Thin Film Coupler," *Optics Comm.*, vol. 9, No. 3, Nov. 1973, pp. 240–245.

Ulrich, R., "Efficiency of optical–grating couplers," *J. Opt. Soc. Am.*, vol. 63, No. 11, Nov. 1973, pp 1419–1431.

Marcuse, D., "Exact Theory of TE–Wave Scatterings From Blazed Dielectric Gratings," *The Bell Systems Technical Journal*, vol. 55, No. 9, Nov. 1976, p. 1295–1317.

Tamir, T. and S. T. Peng, "Analysis and Design of Grating Couplers," *Appl. Phys.*, 14, 235–254 (1977).

Yariv, A. and M. Nakamura, "Periodic Structures for Integrated Optics," *IEEE J. Quantum Electron*, vol. QE–13, No. 4, Apr. 1977, pp. 233–253.

Loewen, E. G. and M. Neviere, "Dielectric coated gratings: a curious property," *Appl. Optics*, vol. 16, No. 11, Nov. 1977, pp. 3009–3011.

Maystre, D., "A new general integral theory of dielectric coated gratings," *J. Opt. Soc. Am.*, vol. 68, No. 4, Apr. 1978, pp. 490–495.

Lee W., and W. Streifer, "Radiation loss calculations for corrugated dielectric waveguides," *J. Opt. Soc. Am.*, vol. 68, No. 12, Dec. 1978, pp. 1701–1707.

Tamir, T. *Integrated Optics*. Chapt. 3, Couplers, Springer–Verlag, New York, 1979, pp. 83–137.

Lee W., and W. Streifer, "Radiation loss calculations for corrugated dielectric waveguides. II. TM polarization," *J. Opt. Soc. Am.*, vol. 69, No. 12, Dec. 1979, pp. 1671–1676.

Chang, K. C. and T. Tamir, "Simplified approach to surface-wave scattering by blazed dielectric gratings," *Appl. Opt.* vol. 19, No. 2, Jan. 15, 1980, pp. 282–288.

Chang, K. C., V. Shah and T. Tamir, "Scattering and guiding of waves by dielectric gratings with arbitrary profiles," *J. Opt. Soc. Am.*, vol. 70, No. 7, Jul. 1980, pp. 804–813.

Miyanago, S. and T. Asakura, "Intensity profile of outgoing beams from uniform and linearly tapered grating couplers," *Appl. Opt.*, vol.20, No. 4, Feb. 15, 1981, pp. 688–695.

Moharam, M. G. and T. K. Gaylord, "Diffraction analysis of dielectric surface–relief gratings," *J. Opt. Soc. Am.*, vol. 72, No. 10, Oct. 1982, pp. 1385–1392.

Gaylord, T. K. and M. G. Moharam, "Analysis and Applications of Optical Diffraction by Gratings," *Proc. IEEE*, vol. 73, No. 5, May 1985, pp. 894–937.

Suhara, T. and H. Nishihara, "Integrated Optics Components and Devices Using Periodic Structures," *IEEE J. Quantum Electronics*, vol. QE–22, No. 6, Jun. 1986, pp. 845–867.

Avrutsky, I. A., A. S. Svakhin and V. A. Sychugov, "Interference phenomena in waveguides with two corrugated boundaries," *J. Modern Optics*, vol. 36, No. 10, 1989, pp. 1303–1320.

Avrutsky, I. A., A. S. Svakhin and V. A. Sychugov, "High–efficiency single–order waveguide grating coupler," *Opt. Lett.*, vol. 15, No. 24, Dec. 15, 1990, pp. 1446–1448.

Li, L. and M. C. Gupta, "Effects of beam focusing on the efficiency of planar waveguide grating couplers," *Appl. Opt.*, vol. 29, No. 36, Dec. 20, 1990, pp. 5320–5325.

Gupta, M. C. and L. Li, "Effect of beam defocus on the efficiency of planar waveguide grating couplers," *Appl. Opt.*, vol. 30, No. 30, Oct. 20, 1991, pp. 4402–4405.

Bates, K. A., L. Li, R. L. Roncone and J. J. Burke. "Gaussian beams from variable groove depth grating couplers in planar waveguides." *Appl. Opt.* vol. 32, No. 12, Apr. 20, 1993, pp. 2112–2116.

Najafi, S. I., M. Fallahi, P. Lefebvre, C. Wu and I. Templeton, "Integrated Optical Circular Grating Tap Power Divider," *Electron. Lett.*, vol. 29, No. 16, Aug. 5, 1993, pp. 1417–1418.

L.C. West et al., "Non–uniform grating couplers for coupling of Gaussian beams to compact waveguides," *Integrated Photonics Research Technical Digest*, Optical Society of America, 1994, 3 pages.

L.C. West, C. Roberts, J. Dunkel, G. Wojcik and J. Mould, "Non–uniform grating couplers for coupling of Gaussian beams to compact waveguides," Preprint of paper for IPR Tech. Dig., OSA, 1994.

Hagberg, M., N. Eriksson, T. Kjellberg and A. Larsson, "Dependence of output grating efficiency on detuning in surface grating output couplers," *Opt. Lett.*, vol. 20, No. 2, Jan. 15, 1995, pp. 180–182.

Moharam, M. G., D. A. Pommet, E. B. Grann and T. K. Gaylord, "Stable implementation of the rigorous coupled–wave analysis for surface–relief gratings: enhanced transmittance matrix approach," *J. Opt. Soc. Am. A*, vol. 12, No. 5, May 1995, pp. 1077–1086.

Schmitz, M., R. Brauer and O. Bryngdahl, "Gratings in the resonance domain as polarizing beam splitters," *Opt. Lett.*, vol. 20, No. 17, Sep. 1, 1995, pp. 1830–1831.

Pascal, D., R. Orobtchouk, A. Layadi, A. Koster and S. Laval, "Optimized coupling of a Gaussian beam into an optical waveguide with a grating coupler: comparison of experimental and theoretical results," *Appl. Opt.*, vol. 36, No. 12, Apr. 20, 1997, pp. 2443–2447.

Fallahi, M., K. J. Kasumic, S. Penner, O. Nordman and N. Peyghambarian, "Design and fabrication of circular grating coupled distributed Bragg reflector lasers," *Opt. Eng.* vol. 37, No. 4, Apr. 1998, pp. 1169–1174.

Sheard, S. J., M. Li and T. D. Liao, "Waveguide Grating Couplers," obtained from www.eng.ox.ac.uk/˜holsjs/research/files/Couplers.pdf on Apr. 14, 2003, original date online unknown.

Lalanne, P., J. Hazart, P. Chavel, E. Cambril and H. Launois, "A transmission polarizing beam splitter grating," *J. Opt. A: Pure Appl. Opt.*, vol. 1 (1999), pp. 215–219.

Backlund, J., J. Bengtsson, C. Carlstrom and A. Larsson, "Incoupling waveguide holograms for simultaneous focusing into multiple arbitrary positions," *Appl. Opt.*, vol. 38, No. 27. Sep. 20, 1999, pp. 5738–5746.

Backlund, J., J. Bengtsson, C Carlstrom and A. Larsson, "Multifunctional Grating Couplers for Bidirectional Incoupling into Planar Waveguides," *IEEE PTL*, vol. 12, No. 3, Mar. 2000, pp. 314–316.

Orobtchouk, R., A. Layadi, H. Gualous, D. Pascal, A. Koster and S. Laval, "High–efficiency light coupling in a submicrometric silicon–on–insulator waveguide," *Appl. Opt.*, vol. 39, No. 31, Nov. 1, 2000, pp. 5773–5777.

Moreno, E., E. Emi, C. Hafner and R. E. Kunz. "Theoretical Modeling and Optimization of Integrated Optical Nanostructures," CSEM—Scientific and Technical Report 2000.

Mossberg, T. W., "Planar holographic optical processing devices," *Opt. Lett.* vol. 26, No. 7, Apr. 1, 2001, pp. 414–416.

Backlund, J., J. Bengtsson, C Carlstrom and A. Larsson, "Waveguide Input Grating Coupler for Wavelength–Division Multiplexing and Wavelength Encoding," *IEEE Photon. Tech. Lett.*, vol. 13, No. 8, Aug. 2001, pp. 815–817.

Landru, N., D. Pascal and A. Koster, "Modelling of two–dimensional grating couplers on silicon–on–insulator waveguides using beam propagation method," *Opt. Comm.*, vol. 196, Sep. 1, 2001, pp. 139–147.

Mossberg, T. W., "Lithographic holography in planar waveguides," SPIE's International Technical Group Newsletter, Nov. 2001, vol. 12, No. 2., pp. 7–8.

Backlund, J., J. Bengtsson, C Carlstrom and A. Larsson, "Input waveguide grating couplers designed for a desired wavelength and polarization response," *Appl. Opt.*, vol. 41, No. 15, May 20, 2002, pp. 2818–2825.

Taillert, D., W. Bogaerts, P. Bienstman, T. F. Krauss, P. Van Daele, I. Moerman, S. Verstuyft, K. De Mesel and R. Baets, "An Out–of–Plane Grating Coupler for Efficient Butt–Coupling Between Compact Planar Waveguides and Single–Mode Fibers," *IEEE J. of Quantum Electron*, vol. 38, No. 7, Jul. 2002, pp. 949–955.

Ang, T.W. et al., "Highly efficient unibond silicon–on–insulator blazed grating couplers," *Applied Physics Letters* vol. 77, No. 25, Dec. 18, 2000, pp. 4214–4216.

Emmons, R.M. et al., "Buried–Oxide Silicon–on–Insulator Structures II: Waveguide Grating Couplers," *IEEE Journal of Quantum Electronics*, vol. 28, No. 1, Jan. 1992, pp. 164–175.

Moharam, M.G. and Gaylord, T.K., "Rigorous coupled–wave analysis of grating diffraction—E–mode polarization and losses," J. Opt. Soc. Am., vol. 73, No. 4, Apr. 1983, pp. 451–455.

Li, L., "Symmetries of cross–polarization diffraction coefficients of gratings," *J. Opt. Soc. Am. A.*, vol. 17, No. 5, May 2000, pp. 881–887.

M. Palamaru et al., "Photonic crystal waveguides: Out–of–plane losses and adiabatic modal conversion," *Applied Physics Letters*, vol. 78, No. 11, Mar. 12, 2001, pp. 1466–1468.

T. Happ et al., "Photonic crystal tapers for ultracompact mode conversion," *Optics Letters*, vol. 26, No. 14, Jul. 15, 2001, pp. 1102–1104.

A. Talneau et al., "Low–reflection photonic–crystal taper for efficient coupling between guide sections of arbitrary widths," *Optics Letters*, vol. 27, No. 17, Sep. 1, 2002, pp. 1522–1524.

Y. Xu et al., "Adiabatic coupling between conventional dielectric waveguides and waveguides with discrete translational symmetry," *Optics Letters*, vol. 25, No. 10, May 15, 2000, pp. 755–757.

E. Yablonovitch, "Photonic band–gap structures," *J. Opt. Soc. Am. B*, vol. 10, No. 2, Feb. 1993, pp. 283–295.

D. Labilloy et al., "Diffraction Efficiency and Guided Light Control by Two–Dimensional Photonic–Bandgap Lattices," *IEEE Journal of Quantum Electronics*, vol. 35, No. 7, Jul. 1999, pp. 1045–1052.

* cited by examiner

ELECTRONICALLY BIASED STRIP LOADED WAVEGUIDE

PRIORITY APPLICATION

This application claims priority under 35 U.S.C. § 119(e) from U.S. Provisional Patent Application Ser. No. 60/318,456, entitled "Strip Loaded Waveguide with Low-Index Transition Layer" and filed Sep. 10, 2001 as well as U.S. Provisional Patent Application Ser. No. 60/318,445 entitled "SOI Waveguide with Polysilicon Gate" and filed Sep. 10, 2001, both of which are hereby incorporated by reference herein in their entirety.

BACKGROUND OF THE INVENTION

1. Field of the Invention

The present invention is directed to waveguides, and more particularly, to waveguides formed on a substrate.

2. Description of the Related Art

Light offers many advantages when used as a medium for propagating information, the foremost of which are increased speed and bandwidth. In comparison with electrical signals, signals transmitted optically can be switched and modulated faster and can include an even greater number of separate channels multiplexed together. Accordingly, lightwave transmission along optical fibers is widespread in the telecommunications industry. In an exemplary fiber optic communication system, a beam of light may be emitted from a laser diode and modulated using an electro-optical modulator that is driven by an electrical signal. This electrical signal may correspond to voice or data which is to be transmitted over a distance between, e.g., two components in a computer, two computers in a network, or two phones across the country or the world. The light travels in an optical fiber to a location where it is detected by an optical sensor which outputs voltage that varies in accordance with the modulation of the optical beam. In this manner, information can be rapidly transported from one location to another.

Accordingly, various components have been developed to process and manipulate optical signals. Examples of such components include modulators, switches, filters, multiplexers, demultiplexers to name a few. Other useful optical components include lasers and optical detectors as well as waveguides. Many of these components can be formed on a substrate. It is therefore highly desirable to combine a variety of such components into a system that is integrated onto a single substrate. In such a system, optical waveguides theoretically could be used to propagate optical signals between components on the substrate.

SUMMARY OF THE INVENTION

One aspect of the present invention comprises a strip loaded waveguide comprising a slab portion having a first refractive index $n_1$, a strip portion having a second refractive index $n_2$, and a transition portion between the slab portion and the strip portion. The transition portion has a refractive index $n_3$ that is less than the first refractive index $n_1$ and the second refractive index $n_2$.

Another aspect of the present invention comprises a strip loaded waveguide comprising a slab portion and a strip portion. The strip portion is disposed with respect to the slab portion to form a guiding region. A first portion of the guiding region is in the strip portion, and a second portion of the guiding region is in the slab portion. The guiding region propagates light in a single spatial mode and only in a transverse electric mode.

Another aspect of the present invention comprises a strip loaded waveguide comprising a slab portion and a strip portion. The strip portion is disposed with respect to the slab portion to form a guiding region. A first portion of the guiding region is in the strip portion, and a second portion of the guiding region is in the slab portion. The guiding region propagates light in a single spatial mode with a cross-sectional power distribution profile having two intensity maxima. A first intensity maxima is located in the slab portion, and the second intensity maxima is located in the strip portion.

Another aspect of the present invention comprises a waveguide having a guiding region for guiding light through the waveguide. The guiding region comprises a layer of polycrystalline silicon juxtaposed with a layer of crystal silicon.

Yet another aspect of the present invention comprises an apparatus comprising a strip loaded waveguide, a transistor, and a substrate. The strip loaded waveguide comprises a slab portion having a first refractive index $n_1$, a strip portion having a second refractive index $n_2$, and a transition layer between the slab portion and the strip portion. The transistor comprises first and second portions and a dielectric layer therebetween. The dielectric layer of the transistor and the transition layer of the waveguide comprise the same material. The substrate supports both the transistor and the waveguide.

Yet another aspect of the present invention comprises an apparatus comprising a strip loaded waveguide, a transistor, and a substrate. The strip loaded waveguide comprises a slab portion having a first refractive index $n_1$ and a strip portion having a second refractive index $n_2$. The transistor comprises first and second portions and a dielectric layer therebetween. The second portion of the transistor and the slab portion of the waveguide are formed of a single layer of material. The substrate supports both the transistor and the waveguide.

Still another aspect of the present invention comprises a method of changing the index of refraction of a strip loaded waveguide comprising a semiconductor slab and a conductive strip that are separated by an insulating layer. The method comprises dynamically changing the carrier distribution in the semiconductor slab.

Still another aspect of the present invention comprises a waveguide apparatus. The waveguide apparatus comprises a slab portion having a first refractive index, a strip portion having a second refractive index, and a transition portion between the slab portion and the strip portion. The transition portion has a third refractive index that is less than the first refractive index and the second refractive index. The waveguide apparatus additionally comprises a voltage source configured to apply a voltage between the strip portion and the slab portion such that an electric field is introduced between the strip portion and the slab portion.

BRIEF DESCRIPTION OF THE DRAWINGS

Preferred embodiments of the present invention are described below in connection with the accompanying drawings, in which.

DETAILED DESCRIPTION OF THE PREFERRED EMBODIMENTS

Figure 1:
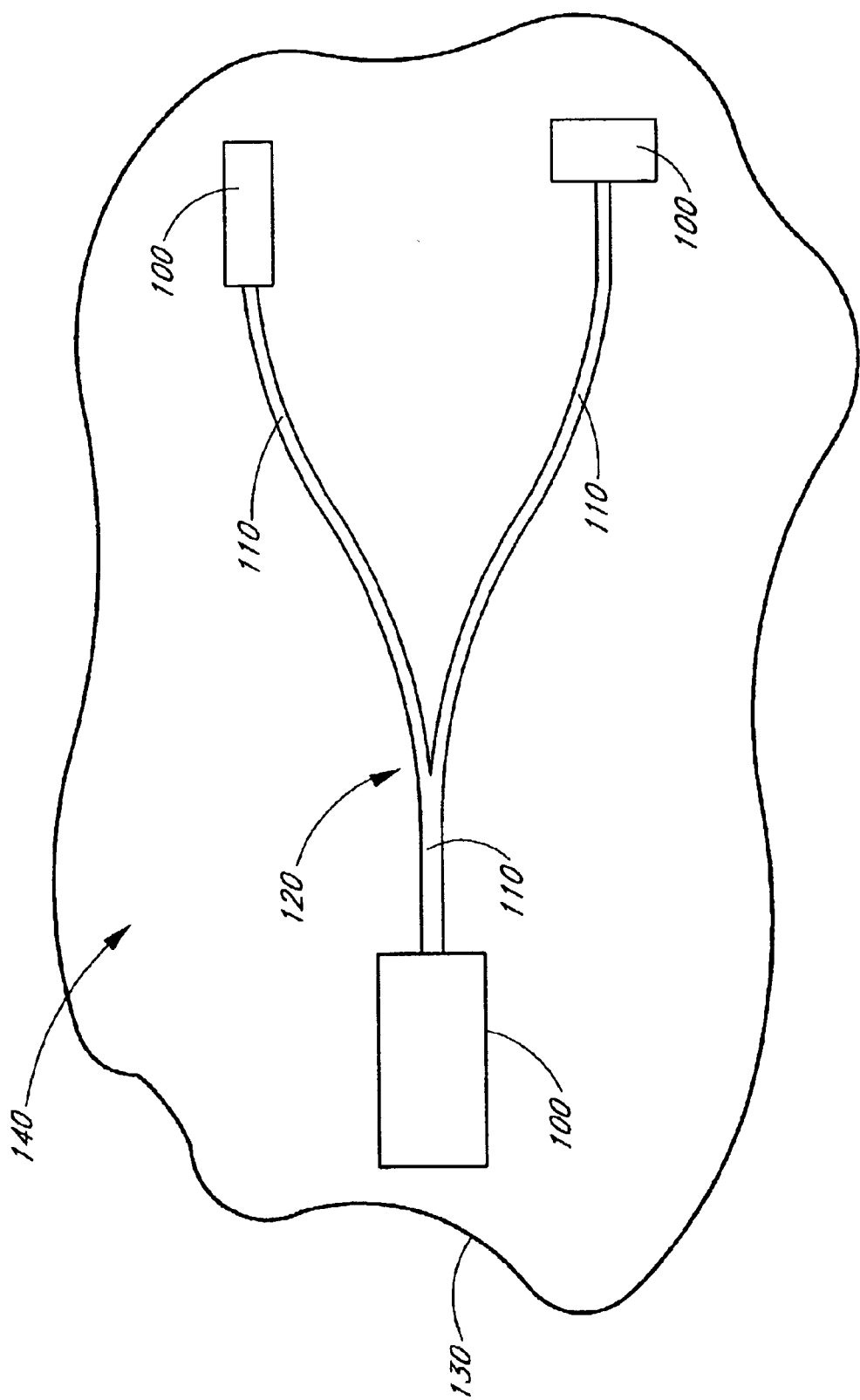
FIG. 1 is a schematic illustration of a generic subsystem comprising a plurality of components connected together via optical waveguides.

One preferred embodiment of the present invention comprises an integrated optical subsystem formed on a substrate. Such subsystems may be part of a larger optical system which may or may not be formed on a single substrate. FIG. 1 illustrates a generic integrated optical subsystem 140 formed on the surface of substrate 130. The substrate 130 may serve as a platform for the integrated optical subsystem 140, and thus preferably comprises a volume of material of sufficient thickness to provide physical support for the integrated optical subsystem 140. This substrate preferably comprises a material such as silicon or sapphire.

In the embodiment illustrated in FIG. 1, a plurality of components 100 are connected by one or more integrated optical waveguides 110 and a splitter 120. The components 100 may comprise optical components, electronic components, and optoelectronic or electro-optic components. The optical and electro-optical components may include waveguide devices or non-waveguide devices, i.e., light may propagate through such components and be guided or unguided. Examples of optical, electro-optic, and optoelectronic components include, but are not limited to, light sources, detectors, modulators, reflectors, polarizers, phase shifters, filters, and mode-converters.

The integrated optical waveguides 110 may be arranged in any configuration to connect components 100 as desired for a particular application. For example, an optical signal from a one component can be transmitted to a plurality of other components through the use of splitter 120, as shown. The variety of configurations of waveguides and components is unlimited. Waveguides can follow different paths and can bend and turn, split, cross, and can be combined. Different components, electrical, optical, electro-optic, and optoelectronic can be included on the substrate, and in various embodiments, can be optically coupled to the waveguides and to each other. In addition, electrical connections can be made to the components and to the waveguides as is discussed more fully below. The arrangement of waveguides and components is not to be considered limited but may include any variety of combinations and juxtapositions.

In some embodiments, the substrate 130 will support a plurality of material layers which together create layers of integrated optical subsystems stacked atop each other. Each of these layered integrated optical subsystems may include waveguides and/or components, electrical, optical, electro-optic, and optoelectronic, formed within a given layer. Such multi-layered stacking will add to the variety of integrated optical designs that are possible. Light can be directed between the various layers using waveguides situated therebetween, gratings such as for example waveguide gratings, and Bragg diffraction elements such as distributed Bragg gratings. Multilayer optical films such as thin film filters can be incorporated to introduce the desired phase delay and may be used to enable various functionalities, such as for example optical filtering. The structures and methods involved in coupling light from one layer to another, however, are not limited to those recited herein.

In general, optical waveguides comprise a core region comprising material that is at least partially transparent. This core region is surrounded by a cladding region that confines light within the core region. Some optical energy, often referred to as the evanescent energy or the evanescent field, however, may exist outside the core region and within the cladding region.

In certain waveguides, the core region comprises a first material having a first refractive index, and the cladding region comprises a second material having a second refractive index, the refractive index of the core region being greater than the refractive index of the cladding region. A core/cladding interface is located at the boundary between the core region and the cladding region. In such embodiments, when light in the core region is incident upon this core/cladding interface at an angle greater than the critical angle, the light is reflected back into the core region. This effect is referred to as total internal reflection. In this manner, optical signals can be confined within the core region due to total internal reflection at the core/cladding interface.

Waveguides can be fabricated in a wide variety of geometries and configurations. An optical fiber is a specific type of waveguide that fits the description above. An optical fiber generally comprises a circularly cylindrical core surrounded by an circularly cylindrical or annular cladding layer. The core has a relatively high refractive index and the cladding has a relatively low refractive index. The core and cladding may comprise, e.g., silica or silica based materials, and are typically flexible, with core diameters of approximately 10 $\mu$m for single-mode fiber. As discussed above, optical fibers are often used to transmit optical signals across large distances, ranging for example from centimeters to thousands of kilometers.

Optical fibers should be distinguished from integrated optical waveguides, which are generally associated with a substrate. The integrated optical waveguide may for example be situated on the substrate, in a substrate, or partially on and partially in the substrate. The integrated optical waveguide may be part of the substrate itself but preferably comprises of one or more layers of material positioned on a surface of the substrate. Examples of integrated optical waveguides include channel waveguides, rib or ridge waveguides, slab waveguides, and strip loaded waveguides, all of which are well-known in the art. In contrast to optical fibers, integrated optical waveguides are less likely to have a circularly symmetric cross-section although in theory they can be circularly cylindrical. Additionally, integrated optical waveguides are generally used to transmit optical signals between locations on the substrate, and thus preferably have lengths ranging from microns to centimeters.

In accordance with conventional usage in the art, optical components that are integrated onto a substrate with integrated optical waveguides, are collectively referred to herein as integrated optics. Such optical component may for example, process, manipulate, filter or otherwise alter or control optical signals propagating within the waveguides. As discussed above, these components themselves may be waveguides that guide light.

One of the simplest integrated optical waveguide configurations is the conventional slab waveguide. The slab waveguide comprises a thin, planar slab surrounded by cladding regions. The cladding regions may take the form of first and second (for example, upper and lower) cladding layers on either side of the slab. The two cladding layers need not comprise the same material. In this simplified example, the slab may be planar with substantially parallel planar boundaries at the interfaces with the first and second cladding layers. Generally, the slab has a higher refractive index than either of the cladding layers. Light can therefore be confined in one dimension (e.g., vertically) within the slab. In this configuration of the slab waveguide, optical energy is not confined laterally to any portion of the slab, but extends throughout the slab due to total internal reflection at the planar boundaries between the slab and the surrounding upper and lower cladding layers.

A strip loaded waveguide is formed by positioning a strip on the slab of a slab waveguide. The slab and the strip located thereon may be surrounded on opposite sides by the first and second (e.g., upper and lower cladding layers). Preferably, the strip has a refractive index that is greater than that of either cladding layer, however, the index of the strip is preferably approximately equal to that of the slab. The presence of the strip positioned on the slab induces an increase in effective index of the slab in the region beneath the strip and in proximity thereto.

Accordingly, the region within the slab that is beneath the strip and in proximity thereto has a higher effective refractive index than other portions of the slab. Thus, unlike the slab waveguide wherein optical energy propagates throughout the planar slab, the strip loaded waveguide substantially confines optical energy to the region of the planar slab layer under the high-index strip. In a strip loaded waveguide, therefore, an optical signal can be propagated along a path in the slab defined by the region over which the high-index strip is placed on the slab. Thus, slab waveguides defining any number and variations of optical pathways, can be created by depositing one or more strips onto the slab having the shape and orientation of the desired optical pathways.

Figure 2:
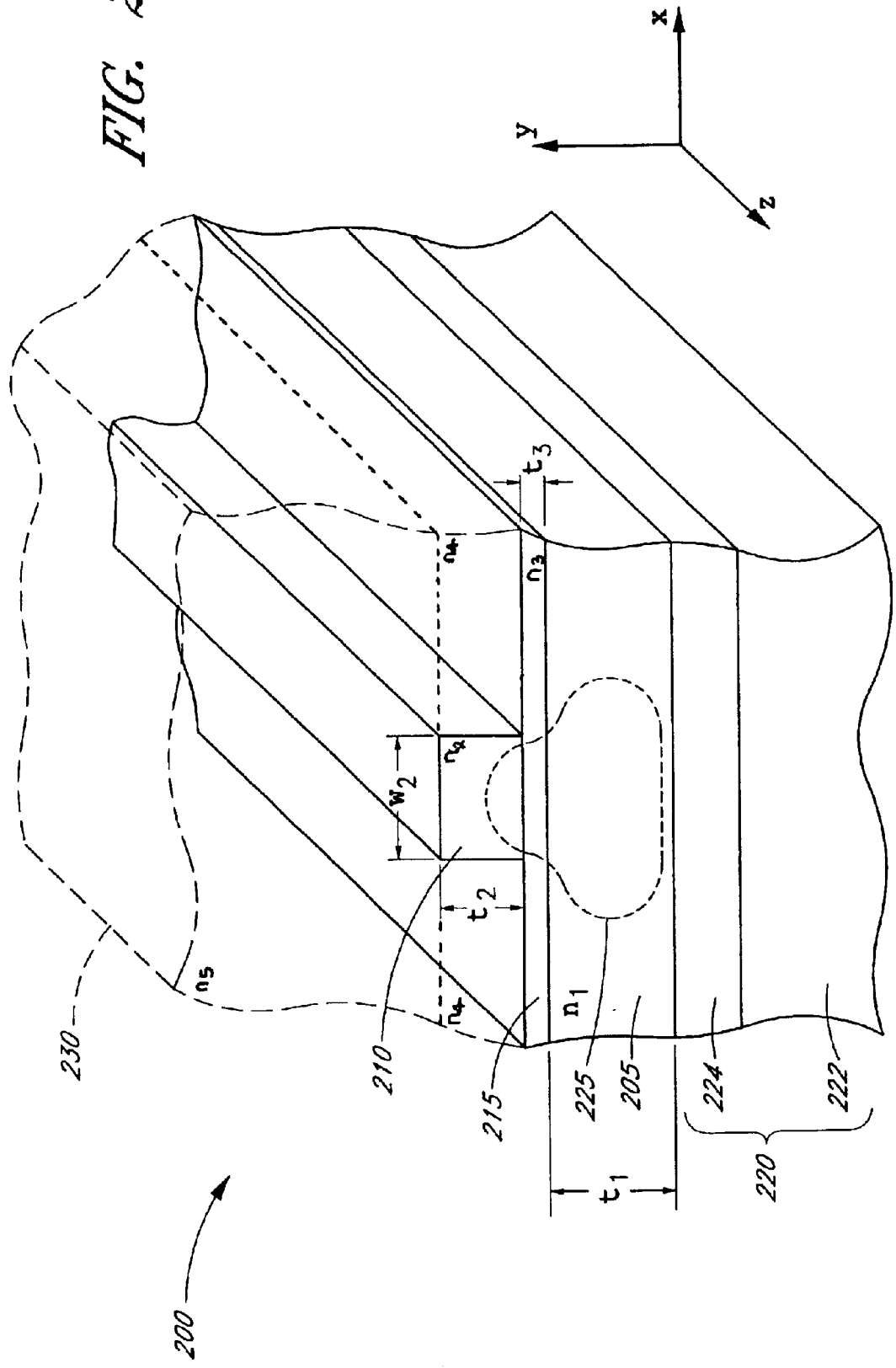
FIG. 2 is a perspective cutaway view of a strip loaded waveguide comprising a slab having a relatively high refractive index, a strip also having a relatively high refractive index formed on the slab, and a transition layer having a relatively low refractive index positioned between the slab and the strip.

FIG. 2 is a schematic cutaway illustration of a preferred embodiment of a strip loaded waveguide 200. The strip loaded waveguide 200 comprises a slab 205 having a first refractive index $n_1$ and a strip 210 having a second refractive index $n_2$. In addition, the strip loaded waveguide 200 has a transition layer 215 having a third refractive index $n_3$. The transition layer 215 is positioned between the slab 205 and the strip 210, such that the slab 205 and the strip 210 do not directly contact each other. The refractive index of the transition layer $n_3$ is less than the refractive index of the slab $n_1$, and the refractive index of the strip $n_2$.

In certain embodiments of the invention, semiconductor materials used in conventional processes for fabrication of semiconductor microelectronics are employed to create strip loaded waveguides. These materials include, but are not limited to, crystalline silicon, polysilicon and silicon dioxide ($SiO_2$). In particular, in one preferred embodiment, the slab 210 comprises single crystal silicon, the transition layer 215 comprises silicon dioxide and the strip 210 comprises polysilicon, although in other embodiments, the strip 210 may comprise crystal silicon. The crystal silicon slab 215 and the polysilicon strip 210 may be doped, for example, in cases where the slab 215 or the strip 210 are to be electronically conductive. In applications where the slab 215 or the strip 210 need not be electronically conductive, the slab 215 and the strip 210 are preferably undoped to minimize absorption losses.

As is well known, single crystal silicon is used to fabricate semiconductor microelectronics and integrated circuits (ICs), such as microprocessors, memory chips, and other digital as well as analog ICs, and thus single crystal silicon is well characterized and its properties are largely well understood. The term single crystal silicon is used herein consistently with its conventional meaning. Single crystal silicon corresponds to crystalline silicon. Single crystal silicon, although crystalline, may include defects such that it is not truly a perfect crystal, however, silicon having the properties conventionally associated with single crystal silicon will be referred to herein as single crystal silicon despite the presence of such defects. The single crystal silicon may be doped either p or n as is conventional. Such doping may be accomplished, for example, by ion implantation.

Single crystal silicon should be distinguished from polysilicon or "poly". Polysilicon is also used to fabricate semiconductor microelectronics and integrated circuits. The term polysilicon or "poly" is used herein consistently with its conventional meaning. Polysilicon corresponds to polycrystalline silicon, silicon having a plurality of separate crystalline domains. Polysilicon can readily be deposited for example by CVD or sputtering techniques, but formation of polysilcon layers and structures is not to be limited to these methods alone. Polysilicon can also be doped p or n and can thereby be made substantially conductive. In general, however, bulk polysilicon exhibits more absorption losses in the near infrared portion of the spectrum than a similar bulk single crystal silicon, provided that the doping, temperature, and other parameters are similar.

As illustrated in FIG. 2, the strip loaded waveguide 200 is preferably located on a supporting structure 220 or substrate. The supporting structure 220 serves to support the strip loaded waveguide 200 and preferably comprises a material such as a silicon or sapphire substrate 222. Additionally, the supporting structure 220 may also include a cladding layer 224, which aids in confining optical energy within the slab portion 205. Accordingly, this layer 224 preferably has a refractive index that is low in comparison to the refractive index of the slab 205.

In one preferred embodiment, the supporting structure 220 comprises a silicon substrate 222 having a cladding layer 224 of silicon dioxide formed thereon. The silicon dioxide layer 224 on the silicon substrate 222 with an index of approximately 1.5 serves as a lower cladding layer for the slab 205 having an index of approximately 3.5. This silicon substrate 222 may comprise doped silicon and may be a commercially available silicon wafer used for fabricating semiconductor integrated circuits. In other embodiments, the cladding layer 224 may comprise silicon nitride. The index of refraction of silicon nitride is approximately 1.9.

In alternative embodiments, wherein the supporting structure 220 comprises a material other than silicon, the cladding layer 224 of silicon dioxide may not be present. For example, the slab 205 may rest directly on a sapphire substrate 222. Processes for growing crystal silicon on sapphire have been developed. In general, in these cases, the supporting structure 220 preferably has an index of refraction lower than that of the slab 205. In other embodiments, an additional cladding layer 224 may be formed on the these non-silicon substrates.

The slab 205 is therefore disposed either on the substrate 222 or on a layer 224 (preferably the cladding) formed over the substrate. This cladding layer 224 itself may be formed directly on the substrate 222 or may be on one or more layers formed on the substrate 222. The slab portion 205 may span the substrate 222 or extend over only a portion of the substrate 222. As discussed above, the slab 205 preferably comprises single crystal silicon and has an index of refraction $n_1$ on average of about 3.5 and has a thickness $t_1$ preferably between about $$\frac{\lambda}{6n} \text{ and } \frac{\lambda}{4n},$$

and more preferably about $$\frac{\lambda}{4n},$$

where n is the index of refraction. This thickness, $t_1$, determines in part the optical mode or modes supported by the strip loaded waveguide and depends partially on the geometry of the structure. In alternative embodiments, the slab 205 may comprise materials other than single crystal silicon and may be doped or undoped and thus may have different refractive indices. The slab 205, however, preferably comprises crystal silicon. Localized doping, such as used to create the source, drain, and channel regions in a transistor, may affect the optical properties of the slab 205. The index of refraction in localized regions of the slab can vary slightly due to doping by ion implantation.

In general, the strip 210 is disposed above and in a spaced-apart configuration with respect to the slab 205. The strip 210 may comprise doped polycrystalline silicon having an index of refraction $n_2$ of approximately 3.5. In alternative embodiments, the strip 210 may comprise doped single crystal silicon having an index of refraction $n_2$ on average about 3.5. As discussed above, however, the strip may also be undoped and may comprise materials other than polysilicon or crystal silicon although these materials are preferred. An example of one such alternative material that may used to form the strip 210 is silicon nitride ($Si_3N_4$), which has an index of refraction $n_3$ of approximately 1.9.

The dimensions of the strip 210 may vary and depend in part on the overall composition and geometry of the waveguide. As with the slab 205, however, the size of the strip 210 determines in part the number of modes to be supported by the waveguide and the wavelength of these modes.

The transition layer 215 is positioned between the slab 205 and the strip 210. This transition layer 215 may span the slab 205 as illustrated in FIG. 2 or extend over only a portion of the substrate 205. Preferably, the refractive index of the transition layer 215 is less than the refractive index of the polysilicon strip 210 and the crystalline silicon slab 205. In one preferred embodiment, the transition layer 215 comprises silicon dioxide having an index of refraction $n_3$ of approximately 1.5.

In various embodiments, the transition layer 215 may include optically active (i.e., gain inducing) material, such as erbium. Waveguide structures that include an optically active gain inducing material in the transition layer 215 can produce gain and amplify or regenerate the strength of the optical signal propagating through the waveguide. Specialized components can be formed using these amplifying structures.

In certain embodiments, the thickness $t_3$ of the transition layer 215 is equal to the thickness of the gate oxide layer of transistors (not shown) positioned on the same substrate as the strip loaded waveguide 200 and fabricated in the same process as the strip loaded waveguide 200. The width of the transition layer 215 may be substantially equal to the width $w_2$ of the strip 210, although in other embodiments, such as illustrated in FIG. 2, the width of the transition layer 215 is greater than the width $w_2$ of the strip 210.

In the waveguide structure illustrated in FIG. 2, the strip loaded waveguide 200 is covered by one or more coatings 230, although these coatings are optional. Two coatings are shown in FIG. 2, one with an index of refraction $n_4$ and another thereon with an index of refraction $n_5$. More or less coatings may be used and in other configurations the coatings 230 can be excluded and replaced instead with air or vacuum. The optional nature of these coatings 230 is emphasized by depicting the coating in phantom in FIG. 2. These coatings 230, however, are useful for protecting the strip loaded waveguide 200 from damage or interference which may occur due to contact with other objects. Accordingly, the coatings 230 preferably completely covers the strip loaded waveguide 200, although in other case, the coating may extend only over portions of the strip 210 or slab 205.

The coatings 230 may also serve as a cladding layer, providing confinement of optical energy within the slab 205 and the strip 210. Accordingly, the coatings 230 preferably have indices of refraction $n_4$, $n_5$ less than that of the slab 205 and the strip 210. The coatings 230 may have an index or refraction equal to that of the low-index transition layer 215 and may comprise the same material as the low-index transition layer 215. Alternatively, the coatings 230 may have a different indices of refraction than the transition layer 215 and may comprise different material. In multilayered integrated optical structures, the coatings 230 may serve as a substrate for second strip loaded waveguide in a layer disposed above a first strip loaded waveguide.

Accordingly, the coatings 230 preferably comprises a solid, possibly electrically insulating material, having a refractive index less than that of the slab 205 and the strip 210. The coatings 230 may, for instance, comprise glass or silicon dioxide. Other materials and, more specifically, other dielectrics may also be employed. Polymeric material, such as for example polyimide may be used in certain applications.

Confinement of light within the slab 205 is provided because the slab 205 has a higher refractive index than the layers above and below. In one preferred embodiment, for example, light is confined within the silicon slab 205 because the silicon slab 205 has a higher refractive index than the glass coatings 230 covering it. In addition, the silicon slab 205 has a higher index than the silicon dioxide cladding layer 224 immediately below it.

The light within the slab 205 is confined to portions beneath the strip 210 because of the presence of the strip 210, despite the fact that the strip 210 is separated from the slab 205. The intervening transition layer 215 does not prevent the strip 210 from determining the shape and location of the optical mode(s) supported in the slab 205.

The presence of the strip 210 positioned proximally to the slab portion 205 induces an increase in effective index of the slab portion 205 in the region directly under the strip 210 and in proximity thereto. This increase in effective index defines a relatively high effective index guiding region 225 wherein light in one or more supported optical modes is guided along the strip loaded waveguide 200. The strip loaded waveguide 200 guides supported modes in the guiding region 225 despite the presence of the transition layer 215 between the slab 205 and strip 210. In particular, the transition layer 215 does not prevent the strip 210 from altering the effective index within the slab 205 and more particularly, from raising the effective index within the slab 205. Preferably, the transition layer 215 has a thickness sufficiently small such that the strip 210 can increase the effective index of the slab 205 in regions immediately beneath and in the proximity thereto. The transition layer 215 is sufficiently thin and the strip 210 and the slab 205 are sufficiently close, although physically separated by the intervening transition layer, that the strip 210 can affect the propagation of light within the slab 205. The transition layer 215 also preferably has an index of refraction that is low in comparison with that of the strip 210 and the slab 205.

The guiding region 225 corresponds to a boundary where a specific portion of the optical energy within the mode, preferably the fundamental mode, is substantially contained and thus characterizes the shape and spatial distribution of optical energy in this mode. Accordingly, the guiding region 225 corresponds to the shape and location of the optical mode or modes in this strip loaded waveguide 200. In the guiding region 225, the electric field and the optical intensity are oscillatory, where as beyond the guiding region 225, the evanescent field exponentially decays.

Figure 3:
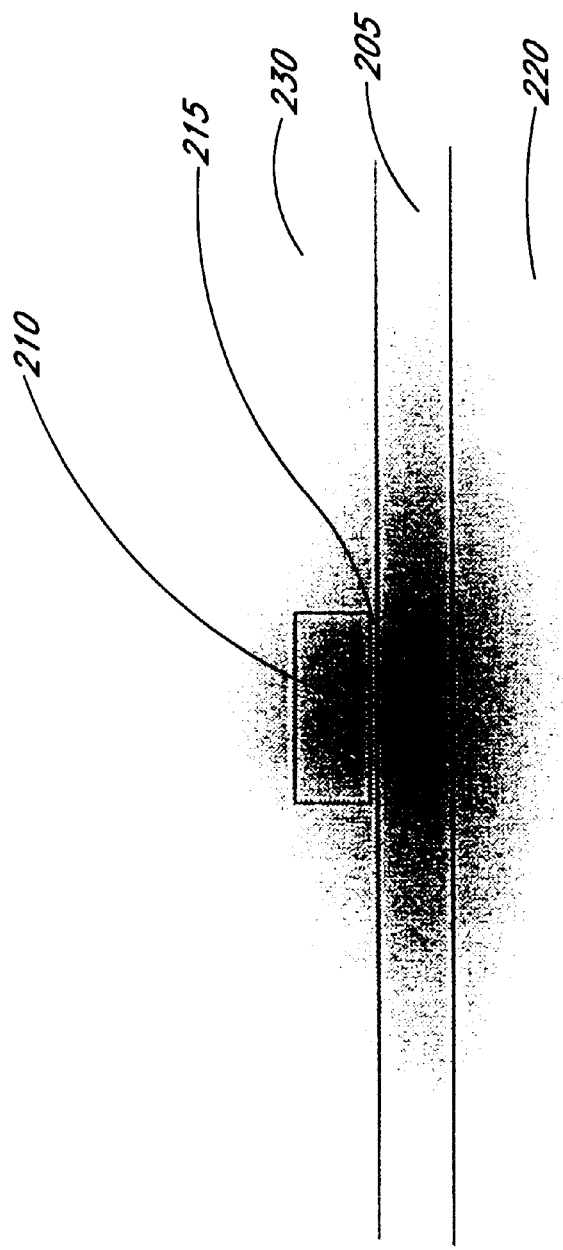
FIG. 3 is a cross-sectional view of a strip loaded waveguide further including a map of an exemplary magnetic field distribution corresponding to the fundamental mode supported by the strip loaded waveguide.

Propagation of an optical signal in the strip loaded waveguide 200 illustrated in FIG. 2 is further characterized by the spatial distribution of the field strength across the cross-section of the strip loaded waveguide 200. FIG. 3 illustrates the magnetic field distribution across a cross-section of the waveguide 200 parallel to the x-y plane. This distribution is the result of modeling using finite difference time domain iterations to calculate the horizontal component of the magnetic field in the mode supported by the structure, i.e., the fundamental mode. The electric field is vertically polarized in this example. The case where the transition layer has the same refractive index as the region surrounding the slab was modeled. As shown, the field strength within the fundamental mode is distributed within the slab 205 despite the presence of the transition layer 215 and the separation between the strip 210 and the slab 205. The field, however, is localized within the strip 210 and in the slab 205 within a region proximal to the strip. This field strength distribution is consistent with the guiding region 225 shown in FIG. 2.

Figure 4:
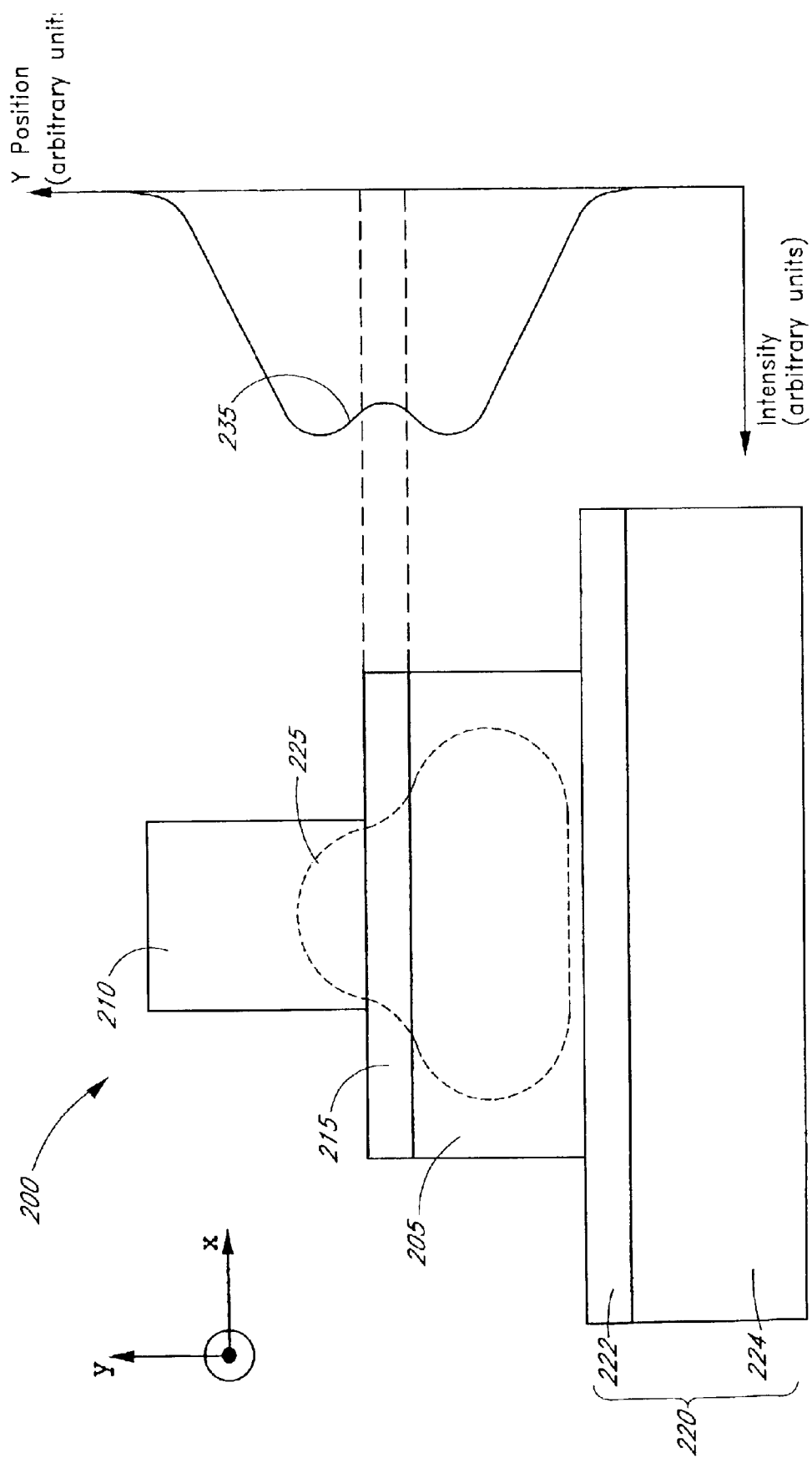
FIG. 4 is a plot on axes of intensity (in arbitrary units) and position, Y, (in arbitrary units) juxtaposed adjacent a cross-sectional view of the strip loaded waveguide showing the optical intensity profile of the fundamental within the waveguide structure.

A schematic diagram of the intensity through the thickness of the waveguide structure is presented in FIG. 4. This plot shows the optical energy substantially confined within the strip 210 and the region of the slab 205 below and adjacent to the strip 210.

The intensity profile shown in FIG. 4 is characterized by the presence of a localized intensity minima 235 in the lowest-order guided mode. The localized intensity minima 235 occurs in the proximity of the transition layer 215 between the strip 210 and the slab 205. Accordingly, this localized minima 235 is likely caused by the presence of the transition layer 215 and the separation of the slab 205 from the strip 210. Nevertheless, the presence of the transition layer 215 does not substantially disrupt the mode. Optical energy can still be propagated along a guiding region 225 partially within the strip 210 and the slab 205. Accordingly, the propagation of light can be controlled and beams can be directed along pathways defined by these strip loaded optical waveguides 200. Integrated optical systems can therefore be constructed wherein light is guided to and from components and thereby manipulated and processed as desired.

Such integrated optical systems can be fabricated using waveguides similar to those disclosed herein. It will be appreciated that, although the strip loaded waveguide 200 illustrated in FIG. 2 has a substantially straight configuration, it will be understood that in alternative embodiments, the strip loaded waveguide can have an unlimited variety of alternative configurations and orientations, including but not limited to bends and turns, and intersections with other strip loaded waveguides. See, e.g., FIG. 1. Additionally, although the strip loaded waveguide 200 illustrated in FIG. 2 has a rectangular cross-section (parallel to in the x-y plane), other cross-sectional geometries can be used, such as a trapezoidal, elliptical, or rectangular. Also, although not shown in the drawings, the corners and edges may be rounded or otherwise irregularly shaped.

As indicated above, an optical signal confined within the strip loaded waveguide 200 can be coupled from or is coupled to other optical components, such as for example modulators, switches, and detectors, at waveguide input ports and the waveguide output ports. These optical components may be waveguide structures having the features described above. Such configurations allow for further processing or transmission of the optical signal.

Furthermore, multiple strip loaded waveguides can be positioned atop each other on the substrate, thereby forming a layered integrated optic structure. Accordingly, a plurality of strip loaded waveguides can be combined into a system comprising waveguide networks, thus allowing optical signals to be coupled between components. The specifications of such alternate configurations may be determined by the particular application in which the strip loaded waveguide structure is to be used.

Advantageously, the specific material systems that can be used to implement these strip loaded waveguides have numerous desirable features. Single crystal silicon and polycrystalline silicon are substantially transparent at wavelengths in the near infrared spectrum (i.e., between approximately 1.3 $\mu$m and 1.6 $\mu$m) and thus provide an efficient medium for the propagation of near infrared light. The combination of silicon (crystalline or polysilicon) and silicon dioxide also possesses a high refractive index contrast, i.e., the difference between the refractive index of the materials is relatively large. In particular, the index of refraction of crystalline silicon and polysilicon is about 3.5 depending on a variety of parameters. In contrast, silicon dioxide has an index of refraction of about 1.5. This disparity in refractive index between silicon and silicon dioxide is approximately 2.0, and is large in comparison for example with the disparity in refractive index between the silica core and silica cladding that make up conventional optical fiber, both of which are about 1.5. The difference between the refractive indices of the core and cladding in silica based fiber is approximately 0.003. This core/cladding index difference in the strip loaded waveguides described above that comprise silicon and silicon dioxide are approximately three orders of magnitude higher than that of silica optical fiber. In other embodiments, the core/cladding index difference is preferably at least about 1.0. High index contrast is advantageous because it provides increased optical confinement of the light within the waveguide. Accordingly, high index contrast allows waveguides having substantially smaller dimensions to be employed. Additionally, sharper bends and smaller bend radii can be incorporated into the waveguides with out excessive losses.

In addition, certain of the embodiments of the strip loaded waveguide can be fabricated using conventional integrated circuit fabrication processes. For instance, the supporting structure 220 may comprise a commercially available silicon wafer with silicon dioxide formed thereon. Conventional "Silicon-on Oxide" (SOI) processes can be employed to form the silicon slab 205 on a silicon wafer or on a sapphire substrate. Fabrication techniques for forming the a crystal silicon layer on an insulator include, but are not limited to, bonding the crystal silicon on oxide, SIMOX (i.e., use of ion implantation to form oxide in a region of single crystal silicon), or growing silicon on sapphire. Oxide formation on the silicon slab can be achieved with conventional techniques for growing gate oxides on a silicon active layers in field effect transistors (FETs). Still other processes utilized in fabricating FETs can also be applied. In the same fashion that a polysilicon gate is formed on the gate oxide in field effect transistors, likewise, a polysilicon strip can be formed over the oxide transition region in the strip loaded waveguide. This polysilicon strip can be patterned using well-known techniques such as photolithography and etching. Damascene processes are also considered possible. Accordingly, conventional processes such as those employed in the fabrication of Complementary Metal Oxide Semiconductor (CMOS) transistors can be used to create the waveguide. In other embodiments, crystalline silicon strips can be formed on the transition oxide region using conventional techniques such as SOI processing.

Another processing advantage is that in the fabrication of polysilicon or silicon strips 210, the transition layer 215 that separates the slab 205 from the strip 210 may in some cases act as an etch stop. For example, in applications where the strip 210 and the slab 205 are etched from the same material, the etch can be configured to stop on the thin transition layer 215 therebetween. This fabrication configuration allows the geometry of the waveguide to be accurately controlled without having to dynamically control the etch depth.

Another strategy for fabricating the strip loaded waveguide is to obtain a commercially available SOI wafer which comprises a first silicon substrate having a first silicon dioxide layer thereon with a second layer of silicon on the first silicon dioxide layer. The aggregate structure therefore corresponds to $Si/SiO_2/Si$. The first silicon dioxide layer is also referred to as the buried oxide or BOX. A second silicon dioxide layer can be formed on the SOI wafer and polysilicon or silicon strips 210 can be formed on this structure to create strip loaded waveguides 200 with the second silicon layer corresponding to the slab 205 and the second silicon dioxide layer formed thereon corresponding to the transition layer 215. The thickness of this second silicon dioxide transition layer can be controlled as needed. The polysilicon or silicon strips can be patterned for example using photolithography and etching. Damascene processes are also envisioned as possible.

In the case where the substrate does not comprise silicon (with a layer of silicon dioxide on the surface), a slab comprising crystal silicon can still be fabricated. For example, crystalline silicon can be grown on sapphire. The sapphire will serve as the lower cladding for the slab. Silicon nitride formed for example on silicon can also be a cladding for the slab. The formation of the transition layer and the strip on the silicon slab can be performed in a manner as described above.

Other conventional processes for forming layers and patterning may also be used and are not limited to those specifically recited herein. Employing conventional processes well known in the art is advantageous because the performance of these processes is well established. SOI and CMOS fabrication processes, for example, are well developed and well tested, and are capable of reliably producing high quality products. The high precision and small feature size possible with these processes should theoretically apply to fabrication of strip-loaded waveguides as the material systems are similar. Accordingly, extremely small sized waveguide structures and components should be realizable, thereby enabling a large number of such waveguides and other components to be integrated on a single die. Although conventional processes can be employed to form the strip loaded waveguides described herein, and moreover, one of the distinct advantages is that conventional semiconductor fabrication processes can readily be used, the fabrication processes should not be limited to only those currently known in art. Other processes yet to be discovered or developed are also considered as possibly being useful in the formation of these structures.

Another advantage of these designs is that in various embodiments electronics, such as transistors, can be fabricated on the same substrate as the strip loaded waveguides. Additionally, integration of waveguides and electronics on the same substrate is particularly advantageous because many systems require the functionality offered by both electronic, optical, electro-optical, and optoelectronic components. For example, with the waveguide structures describe herein, modulators, switches, and detectors, can be optically connected together in a network of waveguides and electrically connected to control and data processing circuitry all on the same die. The integration of these different components on a single die is particularly advantageous in facilitating minimization of the size of devices, such as optical telecommunications devices.

Figure 5:
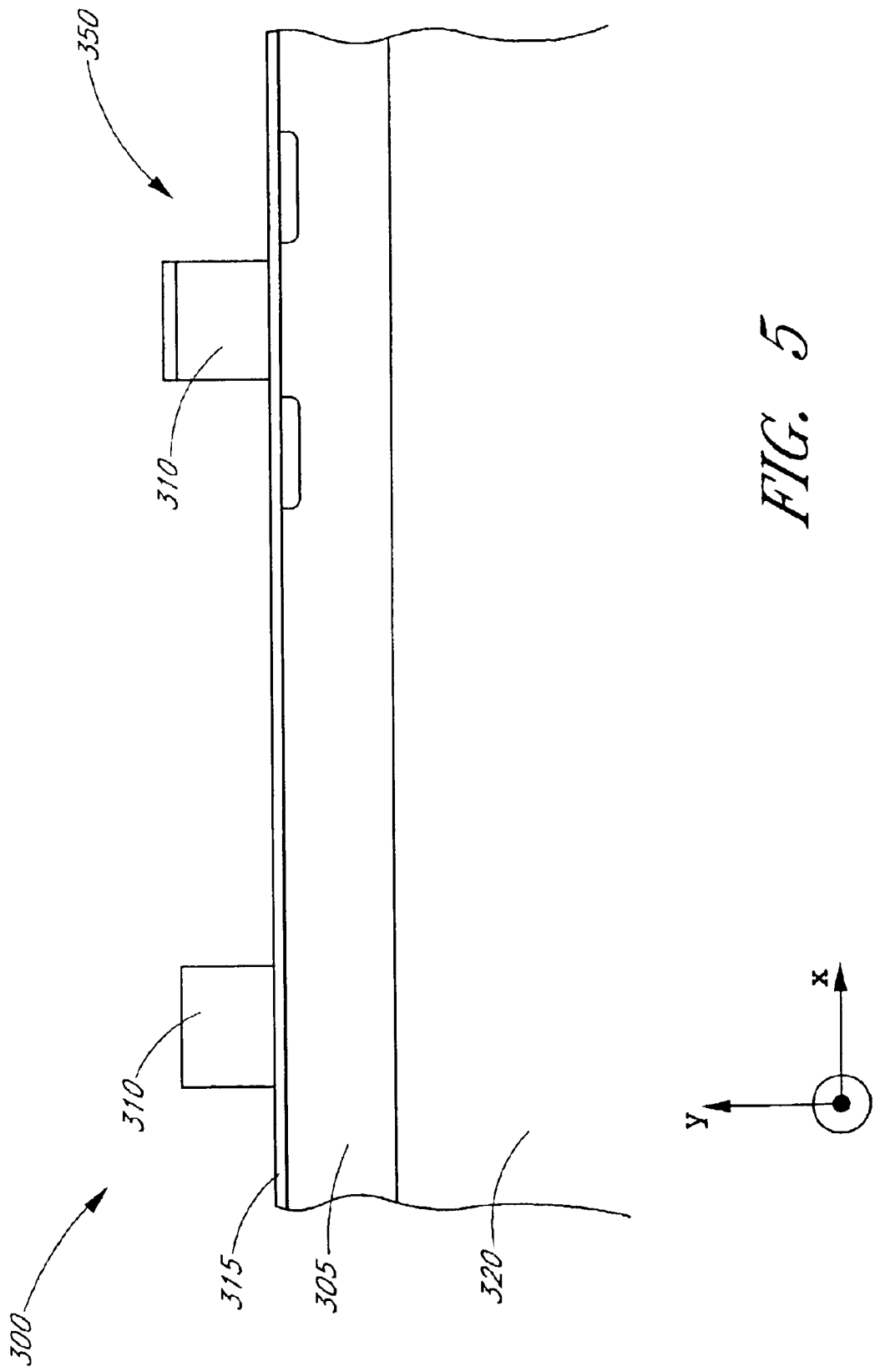
FIG. 5 is a cross-sectional schematic illustration of a strip loaded waveguide and a transistor fabricated on the same substrate.

The integration of integrated optical components and with electronics on a single die is illustrated in FIG. 5, which depicts a cross-sectional view of a strip loaded waveguide 300 disposed on a substrate 320 that also supports a field effect transistor 350. As discussed above, this substrate 320 may comprise a silicon wafer having a silicon dioxide surface layer, or a sapphire substrate. A silicon layer 305 is formed on the silicon substrate 320, and more particularly on the silicon dioxide surface layer of the substrate. This silicon layer 305 corresponds both to the slab of the strip loaded waveguide 300 and the active silicon of the transistor 350. Accordingly, both the slab and the active silicon of the transistor 350 where the channel is formed preferably comprise the same material and substantially the same thickness although the thicknesses may vary in some embodiments. Both may comprise a doped semiconductor. The localized doping concentrations may vary slightly as the transistor will include source, drain and channel regions with different doping than that of the remainder of the semiconductor layer.

A thin oxide layer 315 is formed on the silicon layer 305. This thin oxide layer 315 corresponds to the transition layer of the strip loaded waveguide 300 and the gate oxide of the field effect transistor 350. Accordingly, the transition layer of the strip loaded waveguide 300 and the gate oxide of the FET 350 preferably comprise the same material and preferably have substantially the same thickness although the thicknesses may vary in some embodiments.

A patterned polysilicon layer 310 can be formed on the thin oxide layer 315. This patterned polysilicon layer 310 includes both the strip on the strip loaded waveguide 300 and the gate on the field effect transistor 350. In other embodiments, the gate of the transistor comprises single crystal silicon. Likewise, the strip of the strip loaded waveguide 300 and the gate of the transistor 350 preferably comprise the same material and have substantially the same thickness although the thicknesses may vary in some embodiments. The strip, however, may be an elongated structure to facilitate the propagation of light along a pathway from one location to another on the integrated optical chip. Likewise, this polysilicon or crystal silicon strip may turn and bend, and split or be combined with other strips. In contrast, the transistor gate is preferably not elongated and may be more square than the strip (as seen from the top, i.e., in a plane parallel to the x-z plane shown in the drawings). The shapes of the strips are not restricted to square or even rectangle (as seen from a top) as bends and turns and splitting and combining as well as intersections may be included among the many functionalities of the waveguides. Additionally, transistors often use salicides to enhance conductivity at ohmic contacts. In contrast, unless electrical connections are to be formed on the waveguides, the waveguide structure preferably does not include salicides so as to reduce absorption losses.

Advantageously, in such embodiments the strip loaded waveguide 300 and the transistor 350 can be fabricated using the same fabrication processes. For example, the same substrate may be employed. The slab 305 of the waveguide 300 and the active silicon of the transistor 350 can be formed by the same silicon growth, deposition or other formation process. Similarly, the transition layer 315 and the gate oxide can be grown or formed in the same processing step. The strip 310 and gate can be created both by patterning polysilicon (or crystal silicon) at the same stage of the process. Accordingly, substantially the same fabrication processes can be used to produce both the transistors and the waveguides. In fact, these structures can be realized substantially simultaneously.

In the fabrication of certain semiconductor electronics, it may be desired to provide spacers such as, for example, silicon nitride spacers. In particular, gate spacers positioned adjacent to the gate of the field-effect transistor ("FET") prevent unwanted doping below the gate. This unwanted doping may result from ion implantation employed to dope source and drain regions adjacent the gate. In embodiments wherein strip loaded waveguides and electronic components are formed on the same substrate using the same fabrication process, it will often be desirable to fabricate gate spacers on both the strip loaded waveguides as well as the electronic components although such spacers can be included even when the transistors are not present on the chip.

Figure 6:
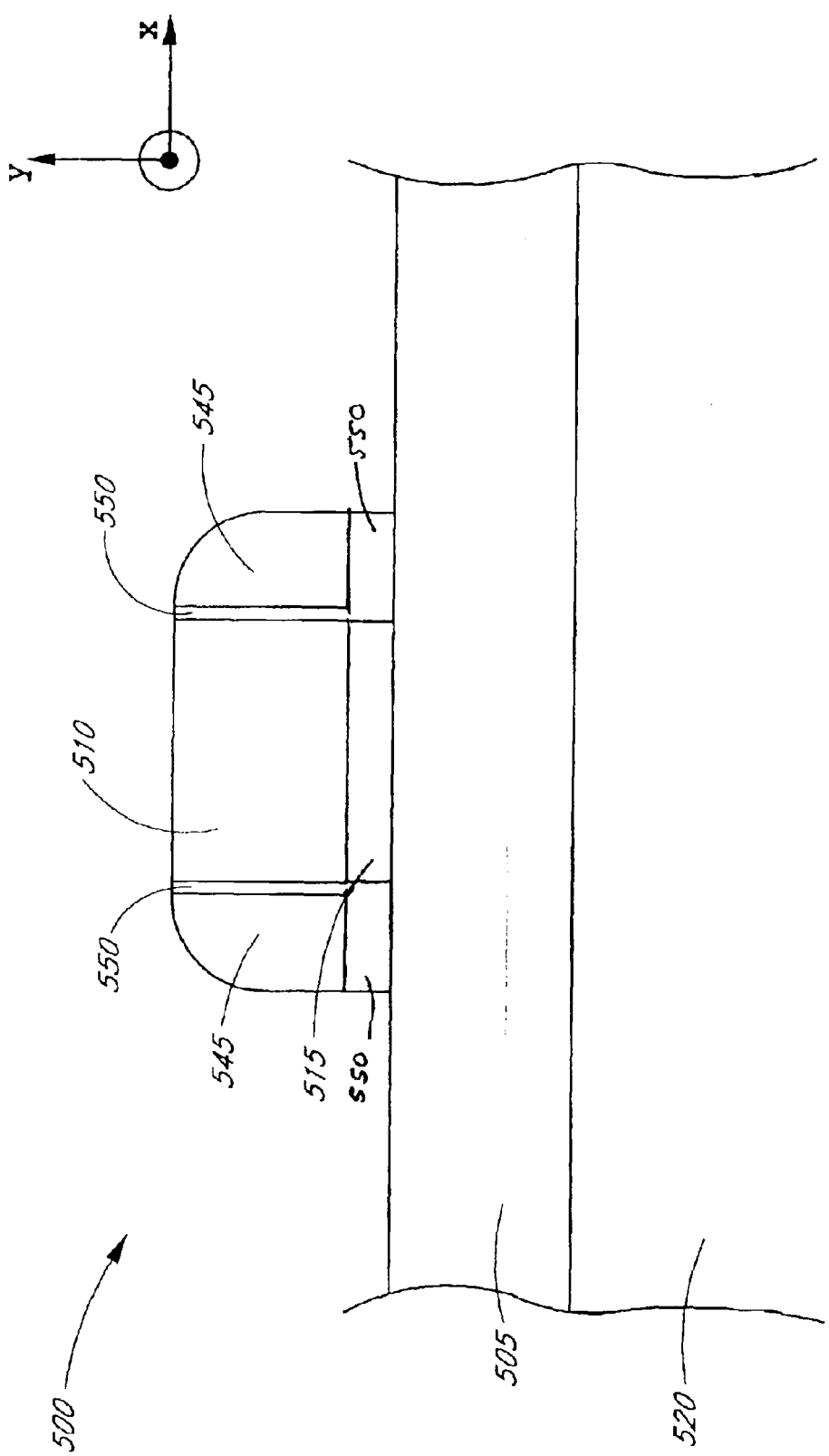
FIG. 6 is a cross-sectional schematic illustration of a strip loaded waveguide including gate spacers.

FIG. 6 illustrates one preferred embodiment of a strip loaded waveguide 500 having spacers 545. The strip loaded waveguide 500 comprises a slab 505, a strip 510, and a transition layer 515 therebetween. The strip loaded waveguide 500 is disposed on substrate 520 which may include a dielectric layer corresponding to the lower cladding of the strip loaded waveguide 500. Spacers (e.g., gate spacers) 545 are fabricated adjacent to the strip 510. The spacers 545 may comprise a nitride or an oxide, although other preferably nonconductive materials can be used in other embodiments. In addition to preventing ion doping in regions proximal to the gate layer in transistors, in certain circumstance, the spacers 545 may prevent doping in the region beneath strip. The spacers can also be used to alter the effective index in the slab and to thereby adjust the confinement within the guiding region and/or to prevent salicide from forming near the waveguide.

FIG. 6 also shows liners 550 between the spacers 545 and the strip 510. These liners 550 may comprise, for example silicon dioxide, and may be used as passivation for the strip or gate 510. The liners may also act as etch-stop layers. In alternative embodiments, the liners 550 may not be present, and the spacers 545 may be in direct contact with the strip 510.

Figure 7:
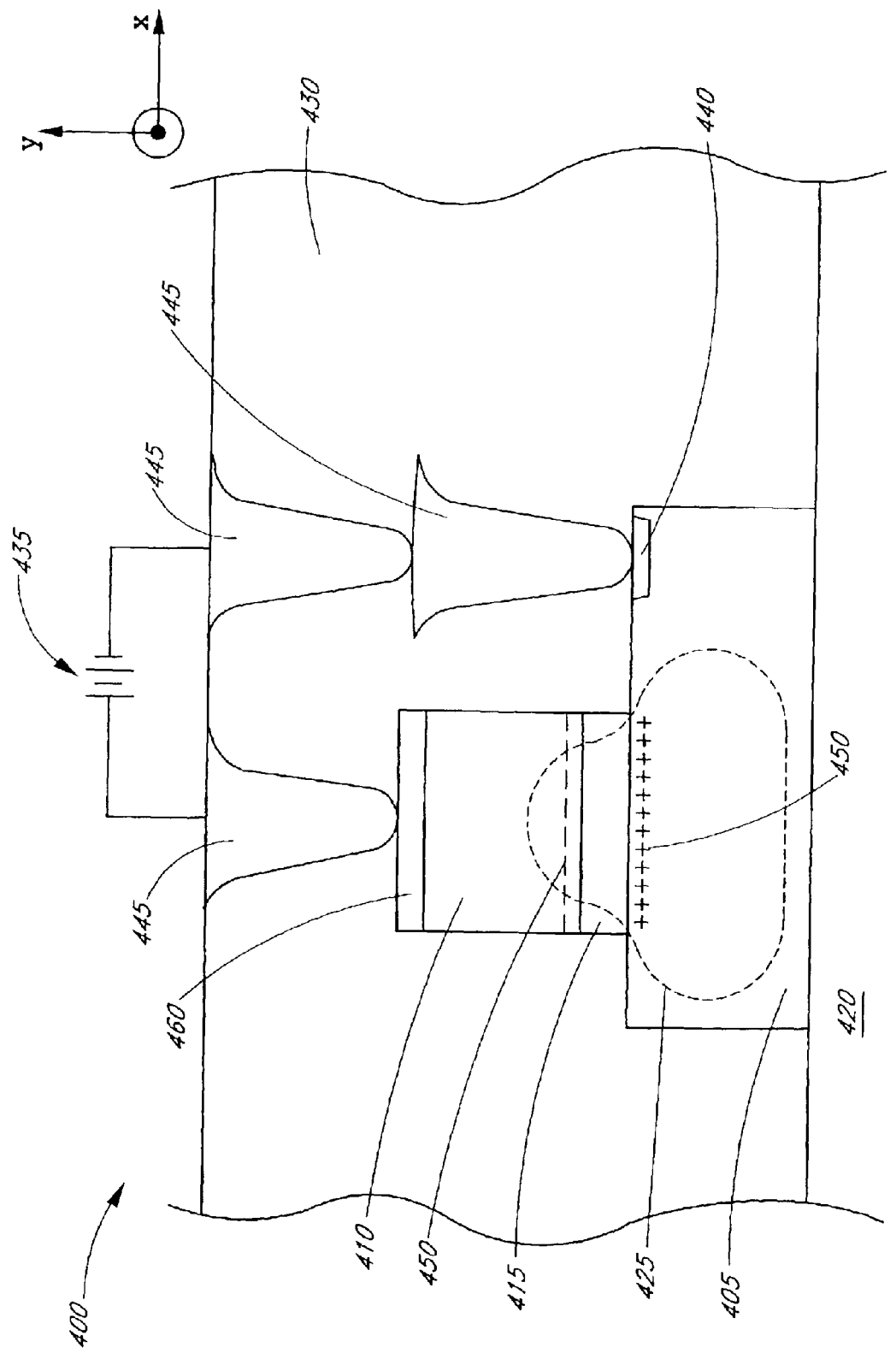
FIG. 7 is a cross-sectional schematic illustration of a strip loaded waveguide configured to be biased electronically.

In various embodiments, the index of refraction of the strip loaded waveguide can be actively controlled with an applied field. FIG. 7 illustrates such a configuration wherein a voltage can be applied across a strip loaded waveguide 400. The strip loaded waveguide 400 includes a slab 405, preferably comprising crystalline silicon, and a strip 410, preferably comprising polysilicon or crystalline silicon disposed on a substrate 420. The silicon slab 405 and the poly or silicon strip 410 are preferably doped so as to be conductive. As described above, a thin transition layer 415, comprising for example gate oxide such as silicon dioxide, separates the strip 410 and the slab 405. A dielectric coating 430, which may be formed from multiple layers, covers the strip 410 and slab 405 and provides electrical insulation. Conductive plugs 445 within the dielectric provide a substantially conductive pathways to the poly or silicon strip 410 and the silicon slab 405. Salicide or metalization 460, and/or ohmic contacts 440, can be formed on or in the polysilicon or silicon strip 410 or the silicon slab 405 to electrically couple the plugs 445 to these portions of the strip loaded waveguide 400. A voltage source 435 is electrically connected to the plugs 445.

Application of a voltage between the polysilicon or silicon strip 410 and the silicon slab 405 causes carriers 450 to accumulate within the guiding region 425 of the strip loaded waveguide 400. For example, depending on the applied voltage, its polarity, and the doping of the strip 410 and the slab 405, electrons or holes may accumulated or be depleted within the strip 410 or the slab 405 in regions adjacent to the thin transition layer 415 comprising gate oxide. The structure acts like a capacitor, charging with application of a voltage. The voltage creates an electric field across the thin transition layer 415 with carriers 450 accumulating (or depleting) adjacent to this transition layer 415. Preferably, the transition layer 415 is sufficiently thick such that the carriers do not traverse this barrier layer by tunneling or through defects, such as pinhole defects. Conversely, the thickness of this dielectric layer 415 is preferably not so large as to require a large voltage to be applied to the device to generate enough carriers to vary the index of the strip loaded waveguide 400. The thickness of this layer will also be affected by similar considerations in transistors formed on the same layer as the strip loaded waveguide 400. For example, in field effect transistors, the gate oxide is preferably sufficiently thick so as to prevent tunneling of carriers from the channel region into the gate but is sufficiently thin such that the voltage required to activate the transistor is not too large.

The magnitude of the applied voltage and the resultant electric field across the transition layer 415 controls the carrier density of the strip loaded waveguide 400. Preferably, the carrier density at least within the guiding region 425 is altered by the application of the voltage. This carrier accumulation or depletion may be concentrated predominately in the strip 410 or the portion of the slab 405 beneath the strip 410. The refractive index of semiconductor material alters with variation in carrier concentration. The accumulation of carriers lowers the index of refraction while depletion of carriers raises the index. The refractive index of the strip 410 and portions of the slab 405 can therefore be altered by controlling the carrier density in regions therein. For instance, by accumulating or depleting carriers in the proximity of the transition layer 415, the effective index of the strip 410 and the slab 405 can be altered as desired. In addition to affecting the refractive index, accumulation of carriers also increases absorption. Application of a field can therefore also vary the absorption coefficient associated with the waveguide.

Accordingly, the optical properties of the waveguide 400 may be controllably altered with application of an electric bias. The index of refraction can be varied to alter the effective optical path distance within the guide and adjust or tune the guide for different wavelengths, introduce or reduce phase delay, and increase or decrease optical confinement within the guide, or to otherwise affect the light propagating within the guide as desired. Since the absorption can also be controlled, the intensity of the light can be altered. Electronic biasing therefore can be employed to the modulate the signal or to create other optical or electro-optical components which can be operated by actively changing the index of the refraction and/or the absorption of the waveguide or portions of it. Electronic biasing can also be used to adjust or tune waveguide structures to account for, e.g., manufacturing tolerances, or to configure the structure for different applications.

Gate spacers (not shown in FIG. 7) may further be included as discussed above and may minimize fringing of the electric field in the case where a dielectric coating 230 does not cover the strip loaded waveguide.

Figure 8:
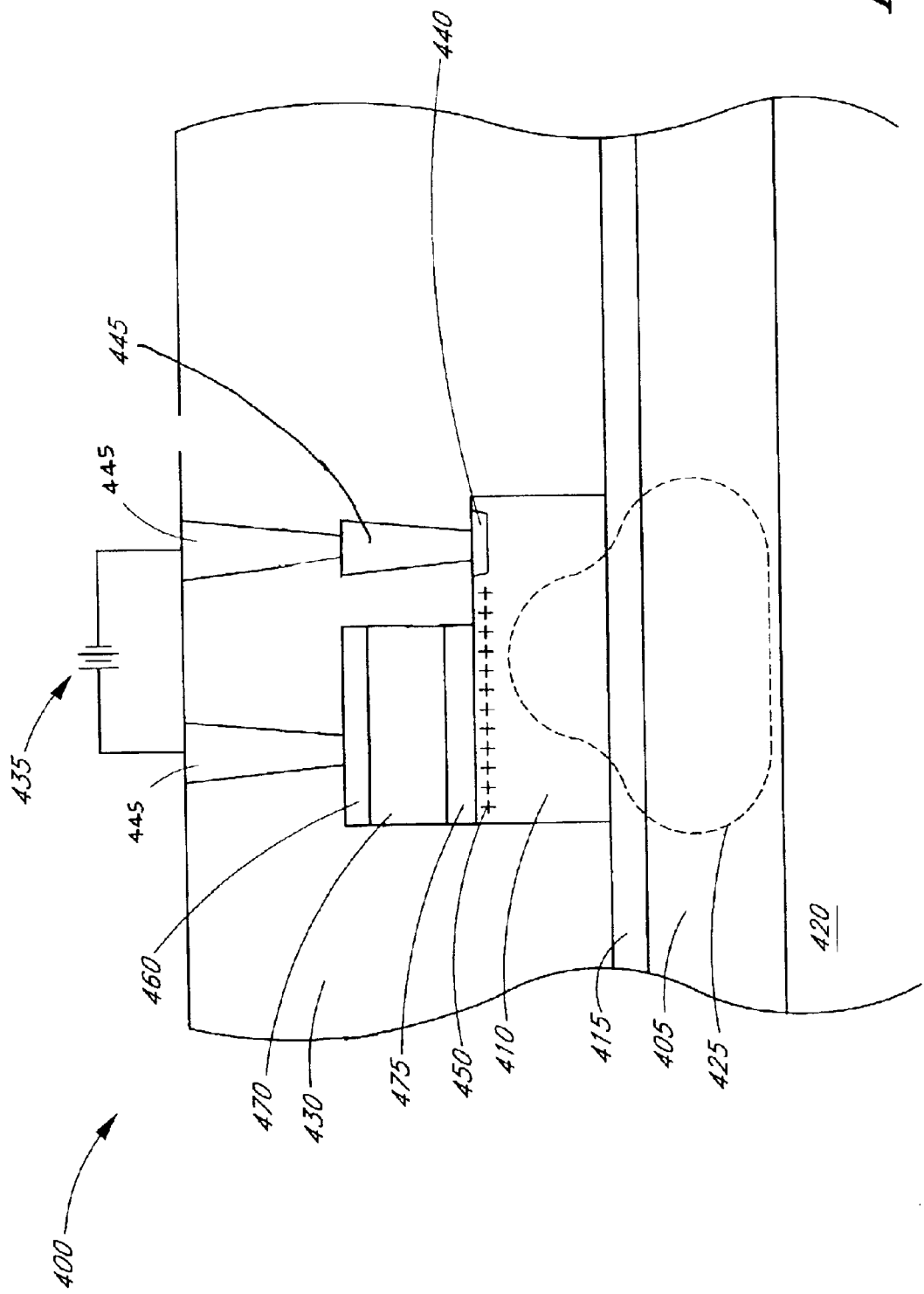
FIG. 8 is a cross-sectional schematic illustration of an alternative strip loaded waveguide configured to be biased electronically so as to alter the index of refraction predominately within the strip.

In an alternative configuration illustrated in FIG. 8, an additional poly or silicon layer 470 can be formed over the strip 410 with a dielectric region 475 separating this additional poly or silicon layer and the strip. Electrical connection may be made to this additional poly or silicon layer 470 and to the strip 410 via metalization 460 on the additional poly or silicon layer and conducting plugs 445 though the dielectric 430 to the metalization. A conductive pathway is also provided to the strip 410 by way of metal plugs 445 and an ohmic contact 440 in the strip. Application of a voltage between the additional poly or silicon layer 470 and the strip 410 will cause carriers 450 to accumulate or be depleted in the strip 410. This arrangement enables the carrier density of the strip 410 to be altered independent of the carrier density within the slab 405. Accordingly, the index of refraction and/or absorption can be changed predominantly within the strip 410, while these properties in the slab 405 are preferably unaltered. Other configurations suited to the particular application are considered possible. For example, electrically connection can also be made with the slab 405 and a voltage can be applied between the strip 410 and the slab to alter the carrier distribution below the strip and affect the index of refraction in the slab.

In each of these designs, regardless of whether the waveguide is configured for application of an electronic field, the properties of the semiconductor portions can be adjusted based on how the material is doped with impurities, if any.

Also, as discussed above with reference to FIG. 2, the dimensions of the strip 210 and the slab 205 may vary depending on the application of the waveguide. For example, in an application wherein the waveguide must be configured to propagate only a single optical mode, the dimensions of the strip 210 (and possibly the slab 205) may be adjusted accordingly. The dimensions of the strip portion 210 and the slab portion 205 may also depend on the wavelength of the optical signal confined in the waveguide.

In certain embodiments, the dimensions of the strip loaded waveguide 210 can be selected such that only a single mode and single polarization can be propagated in the guiding region 225. These special strip loaded waveguides are single mode waveguides that in addition only support one polarization. In one example, for instance, the dimensions of the waveguide can be designed so as to support only the transverse-electric ("TE") fundamental mode. The TE mode corresponds to light having a polarization parallel to the interface between the slab 205 and transition layer 215 or the strip 210 and the transition layer 215 (that is, with the electric field is parallel to the x-z plane as defined in FIG. 2). For light having a wavelength of 1.55 $\mu$m, single TE mode operation can be obtained by configuring the thickness of the slab portion 205 to be approximately 110 nm, the thickness of the strip portion 210 to be approximately 95 nm, and the thickness of the transition portion 215 to be approximately 40 nm. The strip 210 has a width of about 0.5 micrometers. Finite difference time domain iterations and eigenmode solvers can be used to determine appropriate dimensions for other such strip loaded waveguides that supports a single TE mode. In this particular case, the slab portion 205 and the strip portion 210 both comprise single crystal silicon, and the transition portion 215 comprises silicon dioxide. However, specific embodiments with different materials and different dimensions can be obtained that support only a single polarization mode. Such a configuration may be particularly advantageous in certain polarization-dependent applications where only one polarization is required. Such a waveguide, for example, can act as a linear polarizer. These waveguides that support a single polarization of the fundamental mode may also be employed to minimize crosstalk.

Figure 9:
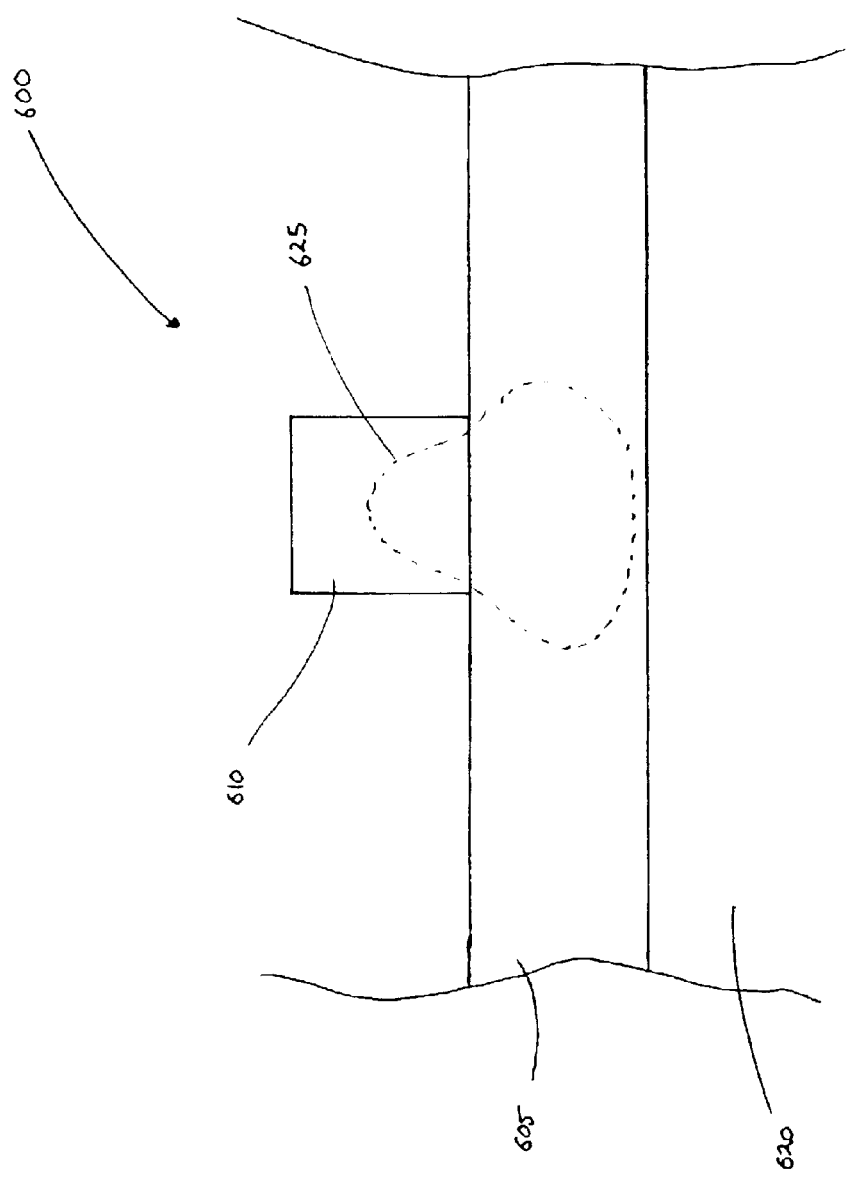
FIG. 9 is a cross-sectional schematic illustration of a strip loaded waveguide comprising a polysilicon strip on a crystal silicon slab and not including a low-index transition layer therebetween.

In alternative embodiments, as illustrated in FIG. 9, the strip loaded waveguide 600 may comprise a strip 610 formed directly on a slab 605 that is supported by substrate 620. In such embodiments, no low-index transition layer is positioned between the strip 610 and the slab 605. The presence of the strip 610 positioned adjacent to the slab 605 induces an increase in effective index of the slab portion 605 in the region directly under the strip 610 and in proximity thereto. This increase in effective index defines a relatively high effective index guiding region 625 wherein light in one or more supported optical modes is guided along the strip loaded waveguide 600. This strip 610 comprises polysilicon and the slab 605 comprises crystal silicon. The crystal silicon slab 605 may be formed on a oxide or nitride layer on a silicon substrate. Other insulator layers may be employed as the lower cladding layer and as the substrate. For example, sapphire may be used as a substrate with crystal silicon formed thereon. One or more layers of lower index material such as glass or oxide may be formed over the strip 610 and the slab 605.

As described above, silicon is substantially optically transmissive to certain wavelengths of interest such as 1.55 microns. In addition, processes for silicon fabricating such structures are well developed. For these reasons, a waveguide comprising polysilicon and silicon is advantageous.

Although silicon is beneficial because it is substantially transparent at certain wavelengths, other materials and more particularly, other semiconductors may be employed. Furthermore, the structures described herein are not to be limited to any particular wavelength or wavelength range and may be designed, for example, for microwave, infrared, visible, and ultraviolet wavelengths.

Those skilled in the art will appreciate that the methods and designs described above have additional applications and that the relevant applications are not limited to those specifically recited above. Also, the present invention may be embodied in other specific forms without departing from the essential characteristics as described herein. The embodiments described above are to be considered in all respects as illustrative only and not restrictive in any manner.

What is claimed is:

1. A method of affecting propagation of light through a waveguide by changing the index of refraction of the waveguide, said waveguide comprised of first and second semiconductor regions electrically isolated from each other by an insulator, the method comprising propagating light through both said first and second semiconductor regions and applying an electric field across said insulator that separates said first and second semiconductor regions to change the distribution of carriers in at least one of the first and second semiconductor regions.

2. The method of claim 1, wherein said at least one of the first and second semiconductor regions is doped.

3. The method of claim 1, comprising introducing carriers into said at least one of the first and second semiconductor regions.

4. The method of claim 1, comprising removing carriers from said at least one of the first and second semiconductor regions.

5. The method of claim 1, comprising applying a voltage without inducing tunneling of charge through said insulator.

6. A waveguide apparatus comprising:
   a slab portion comprising semiconductor, said slab portion having a first refractive index ($n_1$),
   a strip portion comprising semiconductor, said strip portion having a second refractive index ($n_2$),
   a transition portion comprising dielectric between the slab portion and the strip portion, said transition layer electrically insulating said slab portion from said strip portion, the transition portion having a third refractive index ($n_3$) that is less than the first refractive index ($n_1$) and the second refractive index ($n_2$), and
   a voltage source configured to apply a voltage between said strip portion and said slab portion, such that an electric field is introduced between the strip portion and the slab portion,
   wherein said transition layer has a thickness such that an optical mode is supported having a field in both said strip and slab.

7. The waveguide apparatus of claim 6, further comprising an electrical contact formed with said strip portion and an electrical contact formed with said slab portion.

8. The waveguide apparatus of claim 6, wherein said transition portion comprises silicon, dioxide.

9. The waveguide apparatus of claim 6, wherein said slab portion comprises silicon.

10. The waveguide apparatus of claim 6, wherein said strip portion comprises doped polysilicon.

11. The waveguide apparatus of claim 6, wherein said strip portion comprises doped single crystal silicon.

12. The waveguide apparatus of claim 11, further comprising a substrate that supports said slab and said strip.

13. The waveguide apparatus of claim 12, wherein the substrate comprises a silicon wafer.

14. The waveguide apparatus of claim 6, further comprising a lower dielectric layer adjacent said slab, said lower dielectric layer having a refractive index less than the first refractive index ($n_1$) of said slab.

15. The waveguide apparatus of claim 14, wherein said lower dielectric layer is selected from the group consisting of silicon dioxide and silicon nitride.

16. The waveguide apparatus of claim 6, further comprising an upper dielectric layer adjacent said slab and said strip, said upper dielectric layer having a refractive index less than the first refractive index ($n_1$) of said slab so as to provide confinement of light within the strip and the slab.

17. The waveguide apparatus of claim 16, wherein the upper dielectric is selected from the group consisting of glass and silicon dioxide.

18. The waveguide apparatus of claim 6, wherein said slab comprises single crystal silicon.

19. The waveguide apparatus of claim 6, further comprising a substrate that supports said slab and said strip.

20. The waveguide apparatus of claim 19, wherein the substrate comprises a silicon wafer.

* * * * *

UNITED STATES PATENT AND TRADEMARK OFFICE
CERTIFICATE OF CORRECTION

PATENT NO. : 6,990,257 B2 Page 1 of 1
APPLICATION NO. : 10/241285
DATED : January 24, 2006
INVENTOR(S) : Lawrence Cary Gunn, III et al.

It is certified that error appears in the above-identified patent and that said Letters Patent is hereby corrected as shown below:

At column 5, line 65, please delete "$n_1$," and insert --$n_1$--, therefor.

At column 18, line 8, in Claim 8, please delete "silicon," and insert --silicon--, therefor.

Signed and Sealed this

Twenty-first Day of November, 2006

JON W. DUDAS
*Director of the United States Patent and Trademark Office*